United States Patent [19]  [11]  4,170,138
Wiebe  [45]  * Oct. 9, 1979

[54] THERMOMETER AND METHOD OF MAKING SAME

[76] Inventor: Gerald L. Wiebe, 18 W. 077 Williamsburg La., Villa Park, Ill. 60181

[*] Notice: The portion of the term of this patent subsequent to Sep. 9, 1995, has been disclaimed.

[21] Appl. No.: 873,502

[22] Filed: Jan. 30, 1978

Related U.S. Application Data

[63] Continuation of Ser. No. 645,183, Dec. 29, 1975, abandoned, which is a continuation of Ser. No. 454,511, Mar. 27, 1974, abandoned, which is a continuation-in-part of Ser. No. 350,801, Apr. 13, 1973, abandoned.

[51] Int. Cl.² .......................... G01K 1/00; F16B 11/00
[52] U.S. Cl. .......................................... 73/371; 29/450
[58] Field of Search .......................... 73/371, 372, 374; 53/328

[56] References Cited

U.S. PATENT DOCUMENTS 3,961,532  6/1976  Kukuruzinski .......................... 73/371

FOREIGN PATENT DOCUMENTS 963022  5/1975  Fed. Rep. of Germany ............. 73/372
948170  7/1949  France ...................................... 73/371
647142  10/1962  Italy .......................................... 73/371

Primary Examiner—Donald O. Woodiel

[57] ABSTRACT

A thermometer comprises a transparent flexible tubular outer shield, a slender solid rod or core positioned within the shield, the core having a fine groove in the external surface thereof which together with the shield forms a capillary passageway and a bulb housing attached to one end of said tubing to provide a reservoir for expansible temperature indicating fluid. All of the thermometer components can be formed of inexpensive plastic materials.

The manufacturing method for the thermometer includes the steps of inserting the core into the tube by expanding the tube and forcing the core therein to form a thermometer stem, and inserting the lower end of the tubing into the bulb housing, filling the bulb housing with the expansible fluid, and sealing the bulb housing and the top of the thermometer stem. The amount of fluid within the bulb housing can be accurately controlled by using a cap having an escape port and a plunger portion to express any excess fluid from the bulb through the escape port during assembly of the cap, after which the escape port is sealed. Alternatively, the end cap may be eliminated and the reservoir filled through a vent hole in the end thereof by immersing the bulb housing in a heated bath of fluid and utilizing vacuum to draw fluid to a level controlled by a clamp which temporarily crimps the flexible tubing into a capillary closing position at a location corresponding to the temperature of the fluid in the heated bath.

40 Claims, 24 Drawing Figures

THERMOMETER AND METHOD OF MAKING SAME

CROSS-REFERENCE TO RELATED APPLICATIONS

This application is a continuation of application Ser. No. 645,183 filed Dec. 29, 1975; which was a continuation of abandoned application Ser. No. 454,511 filed Mar. 27, 1974; which was a continuation-in-part of abandoned application Ser. No. 350,801, filed on Apr. 13, 1973.

BACKGROUND OF THE INVENTION

This invention relates to low-cost thermometers and to methods of making such thermometers. The thermometers of the present invention are particularly adaptable for use as low-cost clinical thermometers which may be disposed of after a single use.

As is well known, the typical clinical thermometer in present use is made from a glass tube in which mercury or other suitable expansible fluid for indicating temperature is contained in a bulb section and is free to expand in a capillary passage. The use of glass in the construction of prior art thermometers requires extended processing to assure dimensional stability of the capillary tube which influences the accuracy of the thermometer.

When glass thermometers are used, there is, of course, the ever present danger of breakage either during handling or use of the thermometer. This breakage is particularly dangerous with glass mercury thermometers because of the possible ingestion of glass fragments and of the toxicity of mercury. Moreover, the repeated use of glass thermometers by the same individual, or different individuals, requires periodic sterilization and raises the possibility of cross-contamination by virtue of inadequate or incomplete sterilization to the thermometer. This problem is particularly acute in hospitals, clinics and the like. Additionally, the external temperature scale graduations and numerals on the glass thermometer tend to fade and wear off during use and when repetitively subjected to aseptic solutions.

Another problem associated with thermometers is the retention of the expansible fluid, be it mercury or other fluids, at the indicated temperature of the patient. Especially with mercury thermometers, there is a strong tendency (due to the cohesiveness of the mercury) for the expansible fluid to return to the bulb section after the thermometer is removed from the patient. This problem has been solved in the prior art by the addition of a fluid constriction in the capillary tube, which breaks the column of mercury as it attempts to return to the bulb, thus preserving the reading. However, the constriction is difficult to fabricate and necessitates a shake-down of the mercury in the thermometer prior to subsequent use.

Because of the inherent problems associated with glass-mercury clinical thermometers, various types of nonbreakable, non-mercury thermometers have been proposed but as far as is known, none have received commercial acceptance. This failure has been due, at least in part, to deficiencies in the accuracy of the thermometers, and the inability to produce such thermometers at a sufficiently low-cost to permit them to be discarded after a single use.

As will be further described below, the thermometers of the present invention avoid the disadvantages of the prior art thermometers by using all plastic components which resist breakage, are readily sterilizable, and are internally marked to prevent fading of the graduations. These thermometers use a colored non-toxic expansible fluid which rises in the capillary passage to provide a readily visible indication of the temperature of the patient.

SUMMARY OF THE INVENTION

The present invention relates to inexpensive thermometers that are fabricated by a novel high-speed method. Because of their low cost, the thermometers may be discarded after a single use, although the teachings of the invention are applicable to reusable thermometers as well as to the so-called disposable thermometers.

The thermometers of the present invention work on the thermal volumetric expansion principle, but unlike prior art thermometers which utilize the same principle, the thermometers of the present invention utilize a unique capillary passage that is formed by a groove or channel at the interface between two elements. This feature allows for accurate, high-speed, low-cost fabrication of the capillary passage which is one of the primary areas of difficulty in the thermometer field. In a preferred embodiment, the capillary is formed by a fine groove (not unlike the groove in a phonograph record) molded or extruded in the surface of a slender plastic rod. The rod is then enveloped by a tubular shield or sleeve formed of a transparent flexible plastic material as by force fitting, by expansion and subsequent collapse of the sleeve by mechanical or thermal means and the like, so that the circumferential or hoop stress created in the outer tube provides a seal along the groove, and the tube together with the groove forms the capillary passage. The resulting stem assembly having the capillary passage is then attached to a bulb section in which a temperature indicating fluid will be contained.

The central rod or core can be formed with expansion chambers in communication with the capillary passage above and below the clinical range of the thermometer. Alternatively, convoluted capillary passages can be provided for the same purpose. These expansion chambers cooperate with the bulb reservoir to assure accurate expansion of the fluid relative to the temperature graduations which preferably are marked on the rod, but which also may be provided on the shield. An ancillary effect of providing the graduations on the core, and then inserting the core into the plastic tube is that the graduations marked thereon are magnified due to the curvature of the plastic tube. The expansion chambers protect the thermometer against exposure to high and low temperature extremes well above the clinical temperature range, as, for example, may occur during shipment and storage.

In one form of the invention, the bulb section of the thermometer is comprised of a two-piece assembly, namely, a plastic housing, open at one end to receive the tube and core, and open at the other end to receive fluid during a filling operation, and a plastic cap having a fluid escape opening and a sealing flange which functions as a metering plunger after the filling operation and which cooperates with a flange on the housing to provide a positive labyrinth type seal afte the cap is in place. The expelling effect that is created as the cap is inserted into the liquid-filled reservoir forces any excess expansible fluid in the reservoir to escape through the opening in the cap as the cap is inserted on the bulb.

This type of bulb construction permits for accurate filling of the thermometer with expansible fluid since the proper fluid charge is contained in the reservoir section defined by the interior portions of the bulb and cap.

The present invention also contemplates that the bulb section of the thermometer may be provided by a unitary structure having a vent hole in the lower end thereof. The fluid reservoir provided by such a bulb structure can be filled by several techniques. One such technique is to immerse the bulb end of the thermometer into a bath of heated fluid, and to apply a vacuum to the interior of the bulb section through the open end of the capillary passage in the stem portion of the thermometer. A resilient member is preferably provided at the bottom of the bath to initially seal the vent opening in the bulb, and after a vacuum has been drawn in the reservoir and capillary passage, a clamp assembly is applied to the stem portion of the thermometer and a projection on the clamp assembly forces a portion of the flexible shield of the stem into sealing engagement with the capillary passage at a temperature corresponding to the temperature of the fluid bath. The thermometer is then lifted to move the vent opening away from the resilient member, and heated fluid is drawn inwardly into the reservoir and up the capillary passage to the point of blockage by the clamp. The thermometer is then removed from the bath and both ends thereof sealed. The thermometer is then rinsed to complete the filling operation.

Alternatively, thermometers having the unitary bulb section may be placed in a bath of heated fluid with the vent opening in the reservoir in spaced relationship with respect to the fluid container. Vacuum is then applied to the thermometer through the open end of the capillary passage in the thermometer stem to completely fill the reservoir and capillary passage. The vacuum is then released and a clamp, as described above, is then applied to the stem in blocking engagement with the capillary passage at the temperature of the fluid, and excess fluid is drawn off from the stem above the clamp by applying an air stream across the open end of the capillary passage to aspirate the excess fluid. Thereafter the thermometer is removed from the bath and sealed at both ends as described above. If desired, the reservoir vent opening can be sealed before the excess fluid is drawn off.

A method for assembling the various components of the thermometer is disclosed which utilizes a rotary drum or the like in which the thermometers are partially assembled at a plurality of circumferentially-spaced operational stations and then filled and capped. Initially, the core of the thermometer stem is inserted into a precut length of the tube and the resulting assembly is transferred to the next station where the bulb housing is forced over one end of the tube. The assembly is then removed from the drum, filled, and capped or sealed to complete the thermometer.

To facilitate insertion of the core within the tube, the tube is supplied from a roll of tubing which is pressurized to cause it to expand radially when a core approaches the open end of the tubing thereby minimizing the force necessary to insert the core. Alternatively, an expanded heat-shrinkable tubing made from cross-linked polyolefins, poly(vinyl chloride), copolymes of tetrafluoroethylene and hexafluoropropylene, and the like can be used.

DETAILED DESCRIPTION OF THE PREFERRED EMBODIMENTS

While this invention is susceptible of embodiment in many different forms, there is shown in the drawings and will herein be described in detail, preferred embodiments of the thermometer and method of the invention and modifications thereof, with the understanding that the present disclosure is to be considered as an exemplification of the principles of the invention, and is not intended to limit the invention to the embodiment illustrated.

Thermometers formed in accordance with the present invention utilize low-cost materials, and may be manufactured with accurate dimensional tolerance levels to produce temperature measuring units that are surprisingly accurate within the clinical temperature range. The thermometers utilize an inner rod or core upon which a fine surface groove has been formed in the surface thereof, as by molding or extruding. This rod or core is inserted into the bore of a flexible,, transparent plastic tube, or other suitable core envelope and in a liquid-tight relationship therewith. The bore usually has a slightly smaller diameter than the core so that the hoop stress generated in the tube by the core causes the interior surface of the tube to seal the groove, and together to form a capillary passage in which the temperature indicating fluid expands in response to a temperature change.

Figures 1, 2, 3, 4, 5, 6:
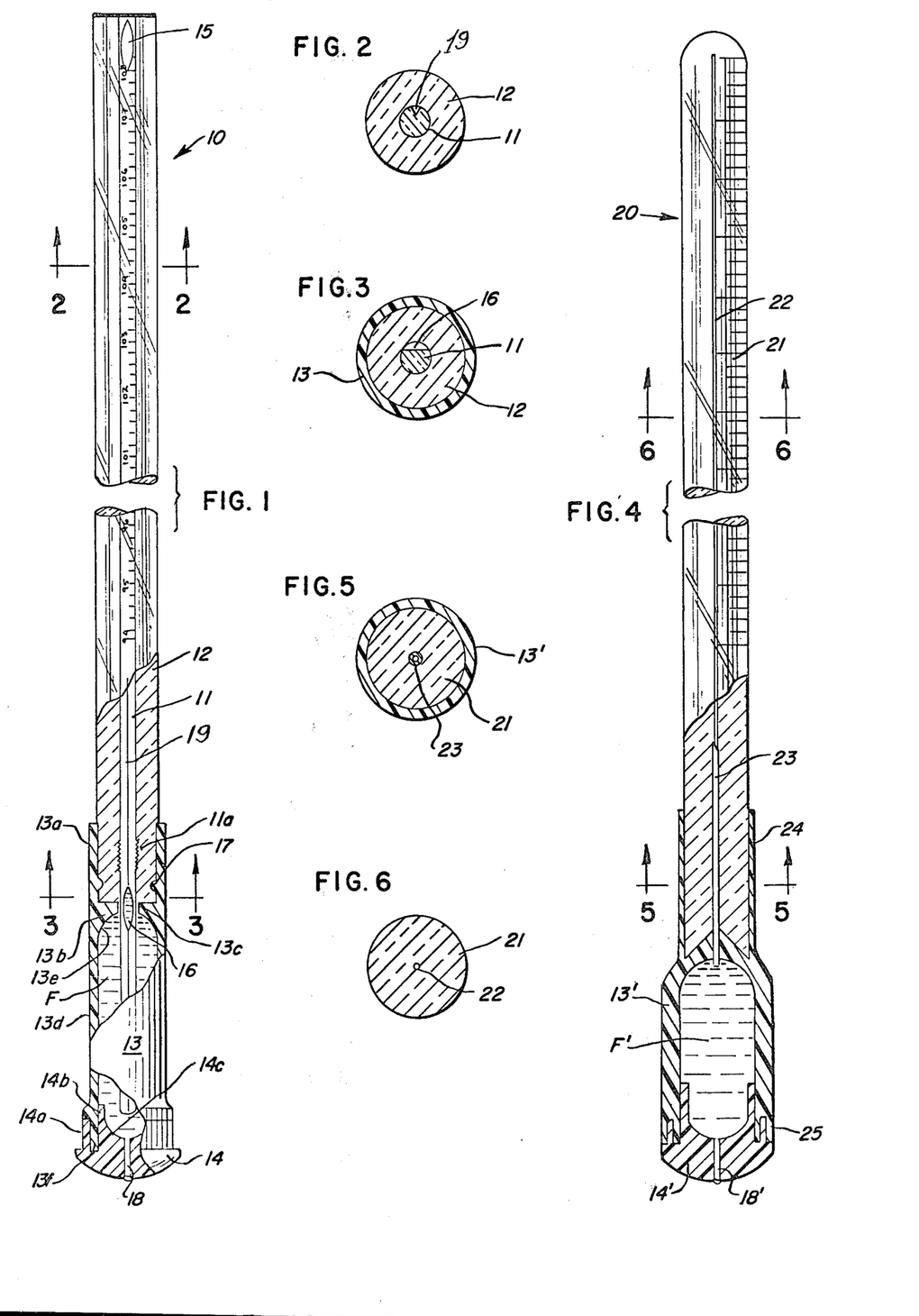
FIG. 1 is a broken elevational view, partially in cross section, of a thermometer in accordance with the present invention.
FIGS. 2 and 3 are enlarged sectional views taken along planes 2—2 and 3—3, respectively, of FIG. 1.
FIG. 4 is a broken elevational view, partially in cross section, of a second embodiment of the present invention.
FIGS. 5 and 6 are enlarged sectional views taken along planes 5—5 and 6—6, respectively, of FIG. 4.

Referring to FIG. 1, the thermometer illustrated theein is denoted in its entirety by reference numeral 10 and is comprised of a plastic rod or core 11, transparent tube 12, reservoir member 13, and cap 14. As is evident from FIGS. 1 and 2, core 11 and tube 12 are both circular elements, with core 11 substantially completely filling the bore within tube 12. As will become evident from the following description, the outer diameter of core 11 is slightly larger than the inner diameter of the bore within tube 12. Core 11 is also formed of a material which is harder than tube 12, with the tube 12 preferably being formed of flexible and compliant plastic material, such as a vinyl polymer, polyethylene, polytetrafluoroethylene, and the like, and with core 11 preferably being formed of a relatively rigid plastic material such as polypropylene. Core 11 may be made of a material having a high coefficient of friction, and also may be provided with a plurality of serrations 11a which bite into the surrounding wall of the tube 12 after assembly to prevent relative movement between the core and the tube.

As illustrated in FIGS. 1 and 2, rod 11 is formed with groove 19, as by molding, extruding, etching or any suitable machining process. Groove 19 cooperates with the inner surface of tube 12 to form a capillary passage for fluid F within reservoir 13, as will hereinafter appear. Groove 19 includes converging side walls (FIG. 2) in the preferred embodiment, and the adjacent tube wall portion cooperates therewith to form a generally triangularly-shaped capillary passage. One of the advantages of the triangularly shaped passage is that even though the passage is very small, a relatively wide and readily visible fluid display area is presented. The present invention also contemplates that the groove in the core may have a cross-sectional configuration other than triangular, e.g. half-moon or rectangular, so long as the groove is readily moldable. So that the thermometer can be readily read, fluid F preferably has a color that contrasts sharply with the color of core 11, although it should be understood that core 11 may be opaque, translucent or transparent.

Core 11 is also formed with upper expansion chamber 15 and lower expansion chamber 16 in communication with the capillary passage. These expansion chambers function to assure that expansible fluid F will remain within the capillary passage in spite of the exposure of the thermometer to temperature extremes beyond the working range of the thermometer. This result is accomplished by providing expansion chambers of increased volume (and consequential lower linear movement) into which the expansible fluid may contract or expand without exceeding the upper range of the thermometer or without contracting into bulb 13 of the thermometer. If fluid F is allowed to contract fully in the bulb 13, air may be introduced into the bulb which might block-off the capillary passage and displace the temperature indicating fluid thus causing incorrect temperature readings.

In one embodiment of the present thermometer, the expansion chambers are positioned to accept the expansible fluid when the thermometer is exposed to temperatures below 80° F. and above about 110° F. In this embodiment, the working range of the thermometer was the clinical range, i.e., 94° F. to 108° F. The lower chamber was designed to contain liquid in the range of −20° F. to 80° F. and the upper expansion chamber was designed to receive liquid between 110° F. to 150° F.

The structure of bulb housing 13 can be best understood from FIG. 1, and as shown therein, housing 13 includes first circumferentially continuous upright wall means 13a that is adapted to receive the lower end of tube 12. Shoulder 13b extends inward from housing 13 and includes a planar upwardly facing surface against which the lower end of tube 12 is positively seated. Shoulder 13b is circumferentially continuous, and includes central clearance passage 13c which freely accepts the end of core 11 when the stem of the thermometer is attached to bulb member 13.

Outer tube 12 (with rod 11 inserted therein) is secured within wall 13a by an annular sealing bead 17 which compresses the tube material to form a seal between the tube and the bulb member. A quick sealing adhesive may be provided on the lower end of tube 12 to bond tube 12 to bulb member 13 if desired. Bead 17 also serves as a wiper to remove excess adhesive from the end of tube 12 so as to prevent any possible contamination of fluid F. Bulb 13 includes further circumferentially continuous wall means 13d on side of shoulder 13b opposite from wall means 13a, and coaxial with wall means 13a so that bulb 13 has a generally smooth external surface throughout the majority of its length. The interior of wall 13d is a cylinder except at its upper end 13e, which is a downwardly facing hemisphere, as viewed in FIG. 1. As noted above, the interior of wall means 13d defines a liquid reservoir chamber for a reception of the thermally responsive fluid F.

Cap 14 includes circumferentially continuous outer flange 14a which is positioned in fluid-tight sealing engagement with end portion 13f of wall means 13d. Cap 14 includes second circumferentially continuous flange 14b spaced inwardly from flange 14a by a distance corresponding to the thickness of wall portion 13f. The interior of cap 14 includes an upwardly facing (as viewed in FIG. 1) recess 14c which cooperates with bulb surface 13e to define the volumetric capacity of the reservoir. Flange 14b is slightly longer than flange 14a, and surface 14c is positioned inwardly of the end of wall portion 13f when the cap is completely in place, with the internal portion of the cap acting as a metering plunger to express excess of fluid F outwardly of the escape port 18 provided centrally of the cap.

The use of cap 14 to define the volume of the reservoir permits for a rapid and accurate filling of the thermometers since a full charge of fluid F, i.e., more than is needed to fill the reservoir, may be introduced into reservoir 13, and then, as cap 14 is pressed into position, excess fluid will be expelled through port 18. After cap 14 has fully seated, flanges 14a and 14b cooperate with wall portion 13f to form a liquid-tight labyrinth type seal. The expulsion port 18 is subsequently sealed and the proper volume of fluid F is established in the reservoir. Lower expansion chamber 16 is located at the level of shoulder 13b, so that when cap 14 is positioned on bulb 13, fluid F will fill the reservoir, it being understood that the capillary passage is sufficiently fine that fluid flow into the passage is prevented as the cap is assembled.

Figure 7:
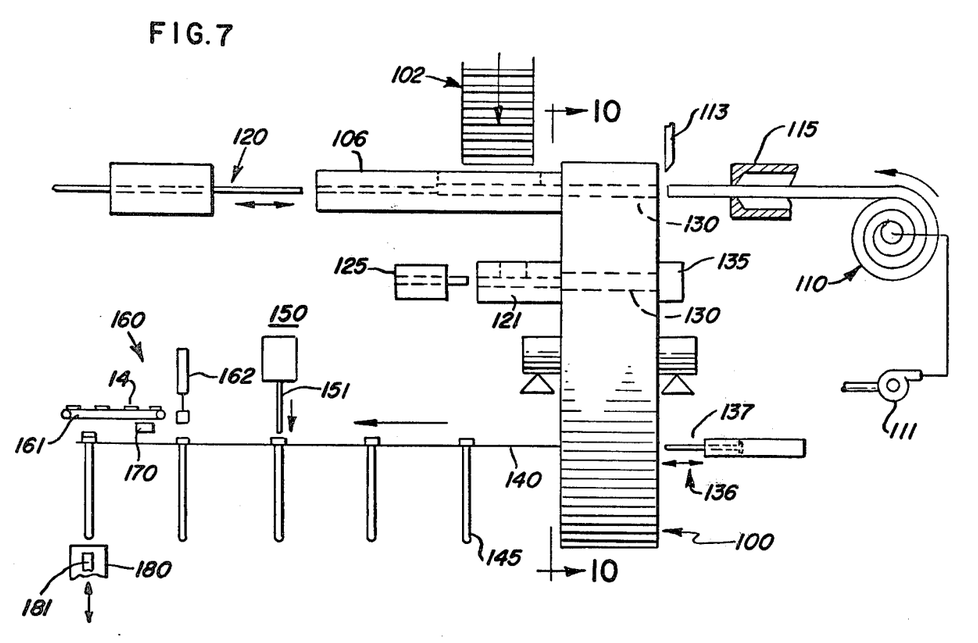
FIG. 7 is a schematic view of an apparatus for forming a thermometer of the preferred embodiment of the present invention.

The above-described thermometer embodiment may be manufactured in a variety of ways but there is shown in the drawings a preferred method of manufacture. Referring to FIG. 7, there is shown schematically an apparatus for producing the thermometer of FIGS. 1-3 which is comprised of a rotatable drum 100 in which (1) core 11 is inserted into tube 12; (2) reservoir member 13 is joined thereto and (3) the resulting assembly is removed for filling of the reservoir with expansible material and capping. It will be appreciated that multiple operating stations may be located at fixed positions around drum 100 so that several thermometers may be formed simultaneously. To this end, drum 100 is provided with a plurality of circumferentially spaced chambers 130 (FIG. 10) located radially from the axis of rotation.

Alternatively, a plurality of assembly jigs may be mounted on a rotating turntable which sequentially moves each jig past a plurality of stations at which assembly of the thermometer takes place. For example, at the first station a predetermined length of flexible tubing is fed into the jig, at the second station a molded thermometer core is directed into the flexible tubing from one end while the tubing is expanded by introducing air under pressure at the other end thereof, at the third station a liquid reservoir for the expansible fluid is slipped over one end of the produced core-and-sleeve assembly, and at a fourth station the assembly is expelled from the jig by an air blast and deposited on a suitable conveyor, e.g., a rotating tray provided with peripherally-spaced notches, which transports the assemblies to a filling and sealing machine.

Central core 11 is most conveniently formed by a molding operation in groups 101 (FIG. 8), which are interconnected by mold gates 101a for ease of handling. Individual rods 11 are preferably molded with groove 19 and expansion chambers 15 and 16 therein, although, as noted above, the groove and chambers may be formed in a subsequent manufacturing step. However, integral molding provides better dimensional tolerance levels.

After group 101 has been molded, temperature scale graduations, numerals, coding and/or other indicia are simultaneously applied to each core of the group. The cores may be marked by a silk screening process, although a direct printing method is preferred because of its reduced cost. For example, the cores of the group may be coated with a light-sensitive emulsion, and the surface of the cores exposed to a light source and a film negative of the desired marking. The cores are then subjected to a water bath, and the portion of the emulsion exposed to light remains as printed indicia on the cores, while the remainder of the emulsion washed off. A variety of colors may be printed on the cores, as desired. It will be appreciated that the printing of the graduations and numerals on core 11 rather than tube 12 protects the printing from chipping or scratching, a common problem with glass thermometers. Moreover, the use of a circular cross-section tube magnifies the size of the capillary passage and printing to make the thermometer extremely easy to read.

Figures 8, 9:
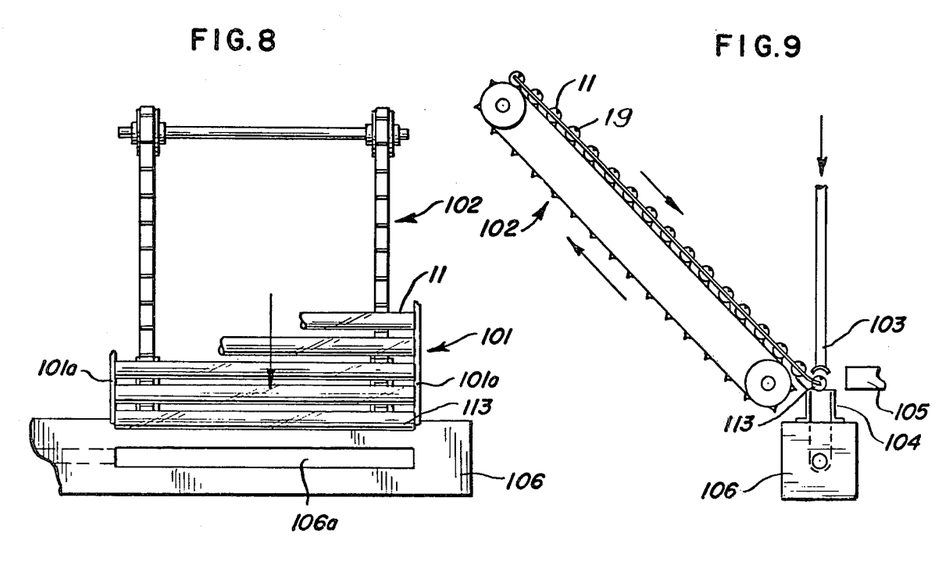
FIG. 8 is an elevational view of the rod group feed mechanism.
FIG. 9 is a side view of the rod group feed mechanism.

Group 101 of marked cores is then placed on a suitable feed mechanism 102 which serially introduces the leading cores to a reciprocating punch mechanism 103 located adjacent the drum 100 (FIG. 9). Punch mechanism 103 severs leading core 113 from group 101 and removes mold gates 101a by means of die 104. As leading core 113 is separated from the group, the severed mold gates are removed from the working area, as by suction source 105, and are suitably disposed of or recycled. Punch 103 then directs leading core 113 downwardly into rod insertion member 106 (discussed below) from which core 113 will be directed into tube 12.

Outer tube 12 is supplied in continuous roll 110, which may be prepared with various aromatic scents, such as vanilla, line, mint, etc., which make the oral thermometer more pleasing to people, especially children. Lengths of tubing, corresponding to the length required for the thermometer, are introduced into drum chamber 130 by reciprocating chuck mechanism 115 which grasps the tubing and positions and holds it within the chamber. After a length of tubing has been inserted into chamber 130, core 11 in member 106 is forced axially into chamber 130 and into the tubing by air cylinder-operated pusher 120. In order to facilitate the insertion of core 11 into the tubing, the tubing is continuously charged from air source 111 which causes the tubing to expand in chamber 130 as the end of core 11 moves into close proximity with the end of the tubing. Thus by utilizing pusher 120 and the expansion of the tubing by compressed air, core 11 is easily inserted into the tubing even though the outer diameter of the core is slightly larger than the inner diameter of the tubing. After the rod has been fully inserted, the tubing is cut from the main supply roll 110 by knife 113', and chuck 115 releases the tubing and returns to the position shown in FIG. 7 to grasp a new length of tubing.

Figure 11:
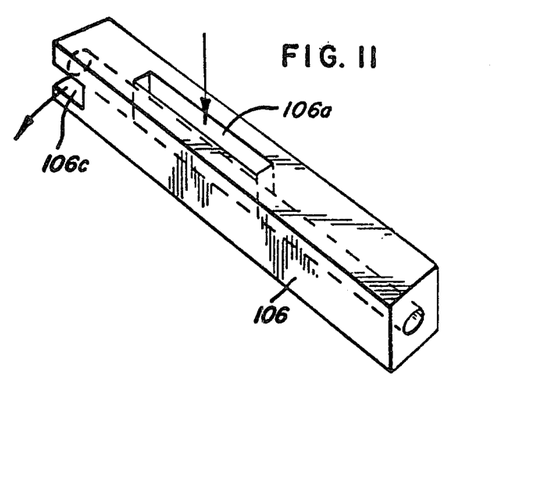
FIG. 11 is a perspective view of the rod insertion member.
Figure 12:
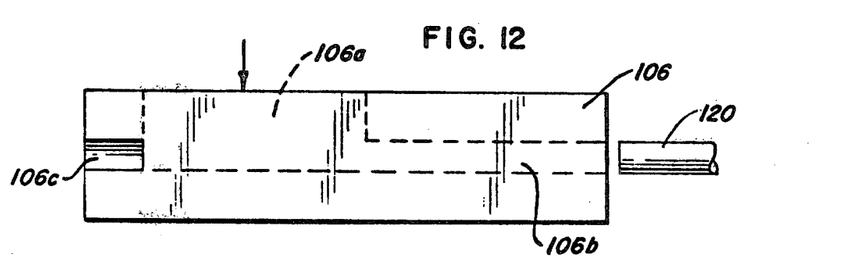
FIG. 12 is a side view of the rod insertion member.

Referring to FIGS. 11 and 12, core insertion member 106 is formed with core reception passage 106a which receives leading core 113 longitudinally from punch 103. Central passage 106b longitudinally traverses the lower portion of passage 106a and provides a stroke path for pusher 120 to travel so that it may introduce the core into the tubing. Release passage 106c coaxially disposed with passage 106b provides a communication passage for core 11 to the tubing within chamber 130. Passage 106c is formed with an arcuate opening on one side in the direction of drum rotation which permits drum 100 to move tube 12 and core 11 assembly to the next operational stage, since, as discussed above, core 11 extends beyond tube 12 after insertion as shown in FIG. 1.

Figure 10:
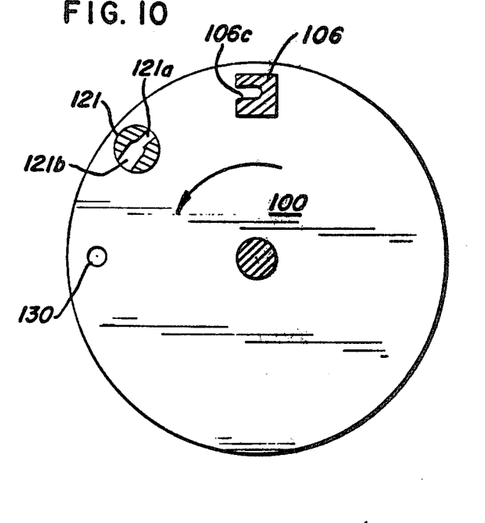
FIG. 10 is a side view of the drum taken along plane 10—10 of FIG. 7.

After the tubing has been cut by the knife 113', a sensing means (not shown) initiates rotation of drum 100 in the direction indicated in FIG. 10, whereby the rod and tube assembly is brought to the next operational stage where bulb 13 is positioned on the end of the tubing. Referring to FIG. 7 and 13-15, bulb insertion mechanism 120' is comprised of bulb insertion member 121 and air-actuated pusher apparatus 125.

Figure 13:
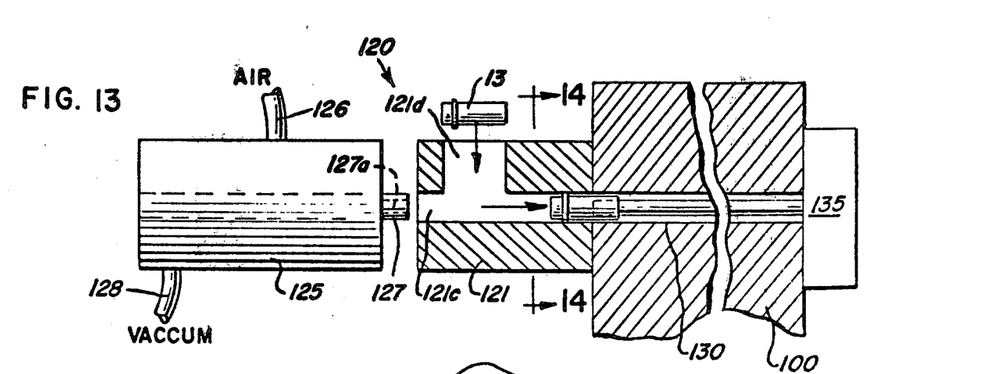
FIG. 13 is a side view, partially in cross section, of the bulb insertion mechanism.
Figure 14:
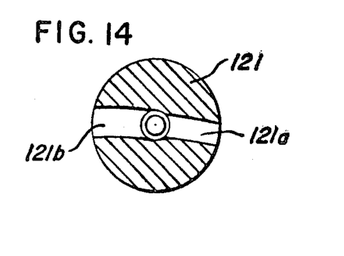
FIG. 14 is a sectional view, taken along plane 14—14 of FIG. 13, of the bulb insertion passage.
Figure 15:
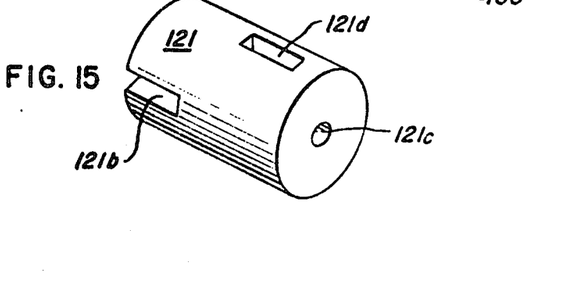
FIG. 15 is a perspective view of the bulb insertion member.

Bulb insertion member 121 is provided with curvilinear entrance and exit ports 121a and 121b, respectively, which permit the assembly to enter and leave this operational stage. As the drum rotates tube 12 and core 11 to the bulb insertion stage, that portion of the rod which extends beyond drum chamber 130 passes through entrance port 121a and is positioned axially with insertion passage 121c of insertion member 121. The position of the rotor is ascertained by suitable sensor means (not shown) as the rod and tubing come into the bulb insertion stage and rotation of the drum is terminated, as by a brake or clutch system (not shown).

Individual bulb sections 13 are fed into the insertion member 121 through entrance ports 121d, which is traversed longitudinally by passage 121c, by feeder means (not shown). When the rod and tubing have been positioned axially with passage 121c, drive air is supplied to pusher mechanism 125 through tubing 126 to force pusher rod 127 axially through passage 121c. Pusher rod 127 is also provided with axial passage 127a which is in communication with a vacuum source through tubing 128. As pusher rod 127 conveys bulb 13 along passage 121c, the bulb receives the extending portion of the core 11 therein and the end of tube 12 engages shoulder 13b. The opposite end of tube 12 is supported against lateral movement relative to chamber 130 from the right-hand portion (FIG. 13) by stop 135 so that the leading portion of bulb 13 may be forced over the end of the tube. Due to the vacuum supplied to the bulb through axial passage 127a and the force of pusher rod 127, tube 12 is inserted in bulb 13 by a combination of the pushing action of rod 127 and the tendency of the tubing and core to move as a unit to the left under the influence of the vacuum in the bulb section.

After bulb 13 has been fully attached around tubing 12, pusher rod 127 is withdrawn and drum 100 is rotated to assembly ejection stage 136, where drum rotation is again stopped and air cylinder-driven pusher 137 (FIG. 7) pushes the entire assembly out of chamber 130 and onto track system 140 (FIG. 7) which is adapted to receive the thermometer assembly and hold it in an inverted position with the open portion of the bulb facing upwardly.

Thermometer assembly 145 is then intermittently conveyed along tracks 140 to filler station 150, and as assemblies 145 pass under filler 151 at station 150, fluid F is directed into the bulb chamber and lower expansion chamber 16, with the bulb chamber being filled to the brim with fluid F. Entire assembly 145 is then conveyed to capping station 160. As noted above, expansible fluid F contains a coloring compound or dye, so that the fluid is readily visible in the capillary passage. Fluid F is of a type which has sufficient viscosity to coat the capillary passage and remain therein for sufficient time to enable the thermometer to be read. Fluid F consisting of a 2% aqueous sodium chloride solution and vegetable dye has been found suitable, but other fluids (e.g. oils, alcohols, polyhydroxy alcohols such as ethylene glycol, propylene glycol, etc.) may be equally adaptable. Particularly preferred thermally expansible fluids are aqueous sodium chloride solutions and lower alkylene glycols.

It should be noted that to insure accuracy in the thermometers of the present invention, certain control temperatures must be maintained during the assembly operation. These controls may be established by applying the graduations and numerals onto core 11 while the core is at a given control temperature, and then adjusting the temperature of expansible fluid F which is introduced into the bulb chamber at station 150 so that the proper amount of fluid, consistent with the expansion characteristics of the thermometer, is maintained. In the clinical embodiment mentioned above, a control temperature of 80° F. is maintained for the fluid and thermometer assembly.

Referring to FIG. 7, reciprocating capping mechanism 162 receives cap 14 from conveyor 161 and inserts it into bulb 13. As caps 14 are placed on bulb 13, the leading portions of flanges 14a and 14b (FIG. 1) of the cap engage the bulb to form a labyrinth seal therebetween, and as the cap is pressed into position, excess fluid F is forced through passage 18, thereby assuring that the proper volume of expansible fluid is contained in the chamber defined by the interior portions of bulb 13 and cap 14. Thermometer 10 then is conveyed to sealing mechanism 170 which heat seals, or otherwise suitably closes, port 18.

For a disposable, or single use thermometer, it is desired to have the capillary passage substantially evacuated, and this may be done subsequent to the sealing of passage 18 by suction head 180 that is reciprocated into sealing engagement with the bottom of the thermometer stem. After the suction has been drawn, sealing member 181 may be reciprocated into engagement with the end of the stem to seal the end of the capillary passge and maintain the suction therein. Alternatively, a suitable sealant material may be applied to the end of the stem after vacuum has been drawn.

One thermometer according to the present invention which may be utilized as a reusable thermometer, i.e., a temporary registering thermometer, had the following specifications: the useful range of the thermometer was 94° F. to 108° F. over a 2 inch long section of the capillary passage, and the design temperature extremes were 0° F. and 150° F. Capillary passage 19 was triangular in cross-section with a 0.010 inch base and a 0.005 inch height. The lower expansion chamber 16, which contains expansible liquid up to 80° F. was triangular in cross-section, 0.5 inch long, 0.030 inch in width and 0.0381 inch in depth. Upper expansion chamber 15 which receives expansible fluid between 108° F. to 150° F. was the same triangular cross-section as the lower expansion chamber but 0.835 inch in length. The fluid reservoir chamber was sized to contain $9.40 \times 10^{-3}$ in.$^3$ of expansible fluid, and the co-efficient of thermal expansion for the fluid was $0.5 \times 10^{-3}$ in.$^3$/°F. The two-inch portion of the capillary passage for useful temperature measurement was spaced from the lower expansion chamber by a two-inch length of intermediate temperature capillary portion, i.e., that portion of the capillary in which the fluid expands between 80°-94° F.

The thermodynamic response of this thermometer was as follows:

A. At 80° F. (the filling temperature) fluid F was at the top of the expansion chamber 16. The pressure in capillary 19 was one atmosphere (14.7 lb./sq. in.).

B. As the temperature decreased from 80° F. to 0° F., fluid F recedes into lower expansion chamber 16 but not into reservoir 13.

C. As the temperature increased from 80° F. to 108° F., the fluid level in capillary 19 increases linearly with temperature.

D. As the temperature increased from 108° F. to 150° F., the fluid level moved up into upper expansion chamber 15.

FIG. 4 to FIG. 6 show a second embodiment of the present invention which utilizes reservoir member 13' and cap 14' to assure a full charge of expansible fluid in the reservoir in a manner similar to the previously described embodiment. Reservoir 13' is provided with a bifurcated outer end portion to improve the seal with cap 14'. The embodiment of FIG. 6 is comprised of plastic stem member 21 in which central capillary passage 22 has been formed. The lower portion of the capillary passage is provided with needle-like member 23 which has the same inner diameter as capillary 22 and which provides for communication between the capillary passage and the reservoir of expansible fluid F'. One end of stem member 21 is positioned in skirt or sleeve portion 24 of reservoir member 13' and may be bonded therein in a suitable manner, such as by adhesive bonding, sonic bonding or chemical bonding.

Referring now to FIGS. 16–19, further thermometer 210 and methods for filling the same are disclosed therein. Thermometer 210 is similar to the embodiment of FIGS. 1–3 to the extent that the stem portion of the thermometer includes solid plastic core 211 having fine capillary passage 219 molded integrally therewith, and transparent flexible plastic tube 212 surrounding core 211 in liquid-tight sealing engagement therewith. Thermometer 210 differs from the thermometer of FIGS. 1–3 in that core 211 is coterminous with tube 212, as is evident from FIG. 16. Thermometer 210 also differs from the thermometer embodiment of FIGS. 1–3 by providing one-piece reservoir 213, thus eliminating the necessity for a separate cap.

Figure 16:
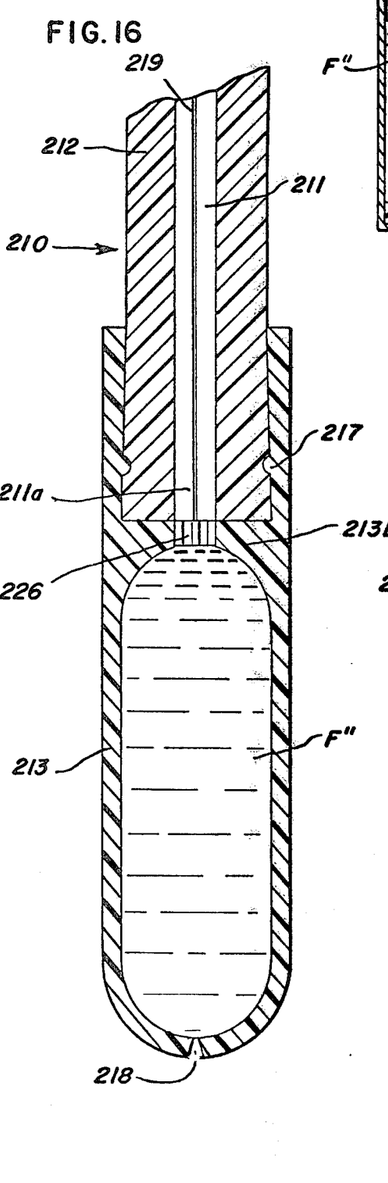
FIG. 16 is a fragmentary cross-sectional view of the lower end of a further embodiment of the thermometer of the present invention.

Bulb member 213 is provided with a circumferentially continuous inwardly facing shoulder 213b against which the lower end of tube 212 seats. In order to maintain core 211 at a fixed elevation relative to tube 212, a plurality of circumferentially spaced radially inwardly extending extensions 226 may be provided on shoulder 213b to be engaged by the lower end of core 211 without obstructing capillary passage 219 when the core and tube are assembled at the bulb housing.

A circumferentially extending inwardly facing tube engaging projection or bead 217 may also be provided on the internal surface of the bulb housing 213 in spaced parallel relationship above the planar upwardly facing surface of shoulder 213b. As with the embodiment of FIGS. 1–3, tube 212 may be bonded to the interior of the upper portion of bulb housing 213 by a quick setting adhesive. In order to enhance the interengagement between tube 213 and bulb 213, lower end 211a of core 211 may be tapered to provide a core portion that is larger in diameter than the remainder of the core. Once the core has been inserted in tube 212, as by the method described above in connection with the embodiment of FIGS. 1–3, lower portion 211a of the core causes the lower portion of the tube to spread outwardly so that when the core and tube are attached to bulb 213, a more positive securement is obtained.

Figure 17:
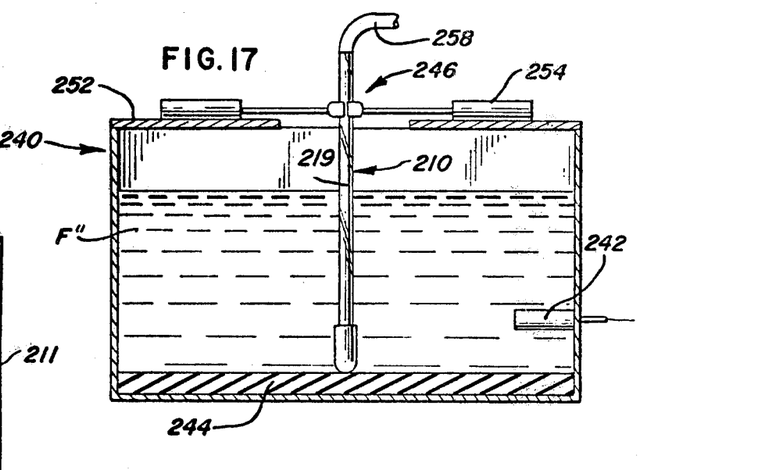
FIG. 17 is a cross-sectional view through a fluid bath that is utilized in the seal of the thermometer of FIG. 16.
Figure 18:
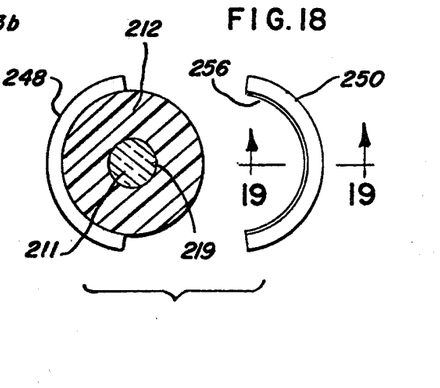
FIG. 18 is a plan view of the clamp structure utilized in connection with the fluid of FIG. 17.
Figure 19:
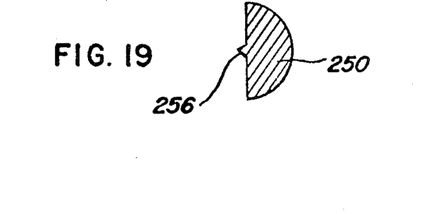
FIG. 19 is an enlarged cross-sectional view taken along plane 19—19 of FIG. 18.
Figure 20:
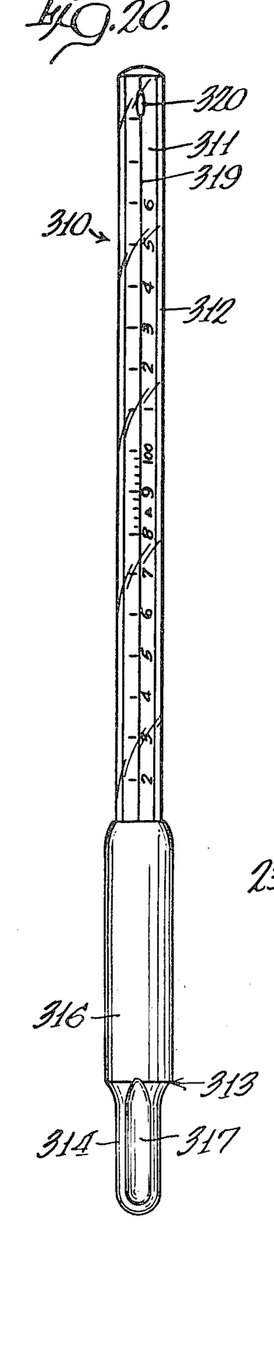
FIG. 20 is an elevational view of yet another embodiment of this invention.

Bulb 213 is provided in the lower end thereof with vent opening or filling port 218 having inwardly tapering walls. The reservoir chamber defined by bulb 213 may be filled by two similar, yet different, methods. Referring now to FIGS. 17 and 18, tank 240 is illustrated in FIG. 17 as including a bath of fluid F" which is retained at a desired temperature, e.g., 101° F., by heating means 242. In a first filling method, resilient sealing member 244 is provided in the bottom of tank 240. Thermometers 210 are placed in tank 240 and held therein by clamping assemblies 246. As is evident from FIG. 17, initially the thermometers are inserted with bulb 213 facing downwardly, and with vent opening 218 in sealing engagement with resilient member 244. Clamping assembly 246 includes a pair of diametrically opposed clamping members 248 and 250, best seen in FIG. 18, both of which are C-shaped in vertical elevation and which have an internal diameter corresponding to the external diameter of tube 212. Clamping members 248 and 250 are supported from frame members 252, and one or both of the clamping members may be moved by fluid-actuated cylinder 254 (FIG. 17).

Thermometers 210 are inserted in clamping assembly 246 with capillary passage 219 facing outwardly toward clamping member 250. Clamping member 250 includes a fine projection 256 (FIG. 19) on the surface thereof facing tube 212, and when clamping member 250 is moved into engagement with tube 212, projection 256 exerts localized pressure to collapse the adjacent portion of the tube inwardly to block off capillary passage 219.

To fill, vacuum hose 258 is connected to the stem end of each thermometer 210 and the thermometers are lowered into the bath with filling opening 218 in sealing engagement with resilient member 244. Hose 258 is then placed in communication with a vacuum source to evacuate capillary passage 219 and the interior of reservoir 213. Thereafter clamp 250 is moved into engagement with tube 212 so that projection 256 collapses tube 212 and seals off capillary passage 219. Clamps 248 and 250 are preferably mounted for vertical adjustment relative to tank 240, as well as for horizontal movement relative thereto, so that projection 256 can engage tube 212 at a precise vertical elevation, i.e., at the temperature of fluid F", as denoted on the scale that has been applied to core 211.

Thermometer 210 is then raised within the bath so that opening 218 is spaced from member 244, and fluid F" flows upwardly to fill the evacuated interior of the bulb reservoir and capillary passage 219 up to the point of projection 256. The vacuum source is then disconnected, hose 258 removed from thermometer 210, and clamping assembly 246 is released. The filled thermometer is then removed from the bath and both ends thereof sealed.

In a second method for filling thermometer 210, a similar bath of heated fluid F" is provided, except that resilient member 244 may be eliminated from tank 240. Vacuum hose 258 is attached to the stem portion of thermometer 210 as illustrated in FIG. 17, and the thermometer is lowered into tank 240 in spaced relationship with respect to the bottom thereof. Hose 258 is then placed in communication with a source of vacuum so as to evacuate capillary passage 219 thus causing fluid F" to completely fill capillary passage 219 and the interior of bulb 213. Clamp 250 is placed in engagement with tube 212 at the vertical elevation corresponding to the temperature of fluid F", preferably at 101° F. for a clinical thermometer. Excess fluid F" above the engagement point of clamp projection 256 is drawn off by blowing an air stream across the open top end of passage 219. The clamp is thereafter released, and the thermometer removed from the bath and sealed as described above. If desired, fill opening or vent 218 can be sealed before clamp 250 is released. The latter sequence is desirable when fill opening 218 is closed by heat sealing, in which case clamp projection 256 prevents the expulsion of fluid F" via capillary passageway 219 during the momentary heating of the bulb region around opening 218 during the heat sealing operation.

To insure complete accuracy of the filling methods described above, bulb 213 is retained in the fluid bath to a depth that closely approximates the depth of insertion into a person's mouth, and the thermometer parts are allowed to remain in the fluid bath for a sufficient amount of time so that the parts are heated to about the temperature of fluid F". By utilizing the filling methods described immediately above, the thermometers are essentially self-calibrating, resulting in a high degree of accuracy.

The aforedescribed filling and sealing steps can be readily adapted to a high-speed, continuous production line operation, for example, by providing a rotary indexing table having a plurality of peripherally-spaced grippers, each adapted to receive and carry a thermometer assembly to peripherally-situated stations at which the aforementioned filling and sealing operations are carried out. The thermometer assembly is received in the gripper means and is first carried to a filling station where the thermometer bulb filling opening or port is immersed in a pool of a thermally expansible liquid and the thermometer stem is connected to a vacuum line so as to fill the bulb and the capillary passage in the thermometer stem with the thermally expansible liquid. Thereafter the stem is clamped to block off the capillary passage at a predetermined point, and the thermometer assembly is transported to a heat-sealing station for closing the filling port in the bulb. For a clinical thermometer the preferred clamping point is at 101° F. on the temperature scale. After heat-sealing, the thermometer assembly is transported to the next station where excess thermally-expansible fluid, i.e., the fluid in the capillary passage above the clamp, is drawn off from the top of the thermometer stem by blowing air thereacross. Then the thermometer assembly is inverted and carried to one or more top sealing stations where sealing compounds, e.g., epoxy resins or the like, are applied to seal off the thermometer end opposite the end attached to the bulb. After the sealing step, the manufacturing sequence is completed and the finished thermometer can be released from the gripper for conveying to an appropriate packaging machine.

A further embodiment of the present invention is shown in FIGS. 20 through 24. Thermometer 310 comprises a stem portion which includes core 311 enveloped in a substantially liquid-tight relationship by flexible, transparent sleeve 312 and liquid reservoir 313 which includes bulb 314 having open top end 315 (FIG. 21) and upstanding skirt 316 about the periphery of open top end 315. To enhance structural strength without unduly increasing wall thickness, bulb 314 is provided with flutes, such as flute 317, spaced about 120 degrees apart. Filling port 318 is provided at the bottom of bulb 314 for introducing a temperature indicating liquid therein in a manner described hereinabove. Preferably, the walls of filling port 318 are tapered inwardly so as to aid in the retention of the liquid within bulb 314 prior to sealing.

Figure 21:
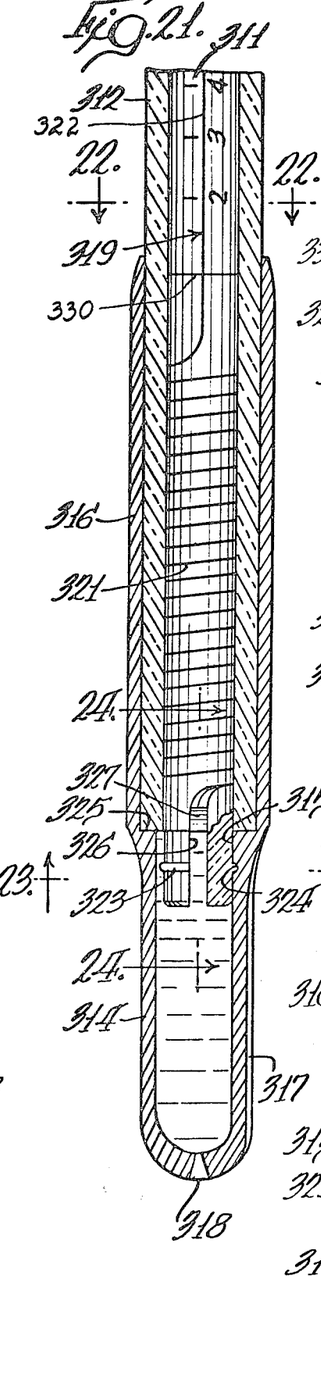
FIG. 21 is an enlarged fragmentary sectional elevation of the embodiment shown in FIG. 20.

Core 311 is provided with surface groove 319 which coacts with surrounding sleeve 312 to form a capillary passge which extends for substantially the entire length of core 311. That portion of groove 319 which receives the temperature indicating liquid contained within bulb 314 at a temperature within the clinical temperature range extends longitudinally along core 311 and appropriate temperature scale markings are provided in the proximity thereof as will be discussed in greater detail hereinbelow. In order to accommodate the temperature indicating liquid at temperatures below or beyond the clinical temperature range without unduly increasing the overall length of thermometer 310, groove 319 is provided with upper expansion chamber 320 beyond that portion of groove 319 which is occupied by the temperature indicating liquid at a temperature within the clinical temperature range, and groove 319 is convoluted a predetermined number of turns in that portion which is occupied by the indicating liquid at a temperature below the clinical temperature range. The number of turns in any given thermometer depends on the low temperature extreme to which thermometer 310 may be exposed when not in use. If desired, upper expansion chamber 320 can also be replaced with a convoluted groove which coacts with sleeve 312.

Dimensionally, convoluted portion 321 of groove 319 may be the same as or different from longitudinal portion 322, as desired. To provide ample volume for liquid contraction within core 311, it is preferred that the volume for unit length of capillary passage in convoluted groove portion 321 is greater than the volume per unit length in longitudinal groove portion 322. As an example, in a clinical thermometer having a working range from about 92° F. to about 108° F., the longitudinally extending groove portion can be a 60-degree V-groove about 0.006 inch wide and 0.003 inch deep, and the convoluted groove portion can be a 60-degree V-groove about 0.012 inch wide and 0.006 inch deep.

For attaching the thermometer stem to liquid reservoir 313, preferably one end of core 311 projects beyond sleeve 312 and frictionally engages the inner wall of the liquid reservoir defined within bulb 314. For secure attachment, the projecting end of core 311 preferably is provided with peripheral ridge 323 (FIGS. 21 and 24) which is received in complementary groove 324 on the inner surface of bulb 314. Inwardly extending circular shoulder 325 is formed at the juncture of bulb 314 and upstanding skirt 316 and serves to provide a circular ridge which functions as an abutment means for sleeve 312 as the thermometer stem is inserted within skirt 316. The abutting end of sleeve 312 is compressed against shoulder 325 when ridge 323 engages groove 324 and acts as a gasket to form a liquid-tight seal between sleeve 312 and bulb 314. Convoluted groove portion 321 usually is situated on that part of core 311 which is surrounded by skirt 316.

To provide optimum fit between sleeve 312 and skirt 316 and to minimize binding upon insertion, the bore of skirt 316 is inwardly tapered. That is, the skirt inside diameter at the upper end of skirt 316 is somewhat larger than at the lower end, i.e., at shoulder 325. Preferably the skirt wall tapers inwardly about 0.001 inch per inch of skirt depth. Also, to provide resiliency to the projecting end of core 311 so that ridge 323 can readily engage complementary groove 324, transverse slot 326 (FIGS. 21, 23 and 24) is provided bifurcating the projecting end. Slot 326 communicates with groove 319 and thus with the capillary passage defined by groove 319 and sleeve 312. Slot 316 preferably is of variable depth, with the deepest portion thereof being at the juncture of slot 326 with the capillary passage. This is accomplished by providing slot 326 with slanting end face 327 (FIGS. 23 and 24) leading to the convoluted capillary passage defined by groove portion 321 and sleeve 312. In this manner, the likelihood of air bubbles becoming trapped within the liquid reservoir defined by bulb 314 as the bulb reservoir is filled with a temperature indicating liquid is substantially reduced.

Figure 22:
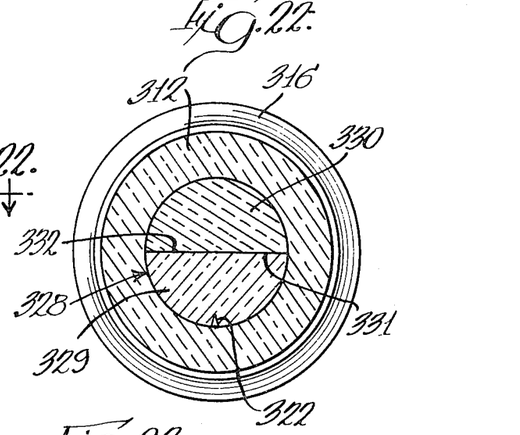
FIG. 22 is an enlarged sectional view taken along plane 22—22 in FIG. 21.
Figure 23:
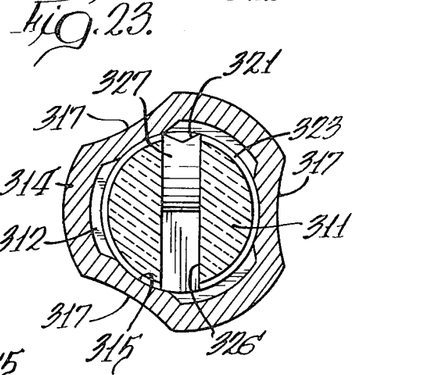
FIG. 23 is an enlarged sectional view taken along plane 23—23 in FIG. 21.
Figure 24:
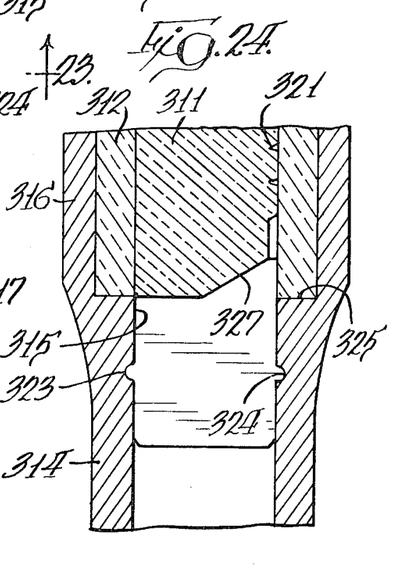
FIG. 24 is an enlarged fragmentary sectional elevation taken along plane 24—24 in FIGS. 21 and 23.

Temperature scale markings can be conveniently placed alongside longitudinal groove 322 by providing a composite region in core 311 which is made up of a transparent portion which carries longitudinally extending groove segment 322 and an opaque portion bearing temperature scale markings which are visible through the transparent portion. As shown in FIG. 22, cylindrical core segment 328 which is part of core 311 comprises transparent semicylindrical portion 329 having longitudinally-extending groove segment 322 along the curved outer surface thereof and contiguous opaque semicylindrical portion 330 bearing temperature scale markings on flat surface 331 thereof which is visible through transparent portion 329. Alternately, the temperature scale markings can be printed or engraved on flat surface 332 of transparent portion 329. In either case, substantial magnification of the markings is achieved by the refraction of light passing through transparent portion 329 and transparent sleeve 312. Semicylindrical portions 329 and 330 can be bonded together in any convenient manner, e.g., by means of a transparent adhesive between the contiguous flat surfaces, by fusion where both semicylindrical portions are thermoplastics, by adhesive bonding at adjacent ends, etc. As shown in FIG. 21, the lower end of opaque semicylindrical portion 330 extends into the upper end of skirt 316.

To obviate the need for matching or alignment of groove segments which together with sleeve 312 make up the capillary passage, preferably core 311 is molded from a transparent material so that all grooves are on the surface of a single molded piece which is provided with a appropriate cut-out region for subsequently accepting opaque semicylindrical portion 330 which is molded separately and then imprinted on surface 331 with the desired temperature scale markings prior to incorporation into the core assembly. The thermometer assemblies shown in FIGS. 20 through 24 can be readily filled and sealed utilizing the methods described hereinabove.

The foregoing specification and the accompanying drawings are intended as illustrative of this invention and are not to be taken as limiting. Still other variations and arrangements of individual parts are possible without departing from the spirit and scope of the present invention.

I claim:

1. A thermometer comprising: an elongated tubular shield of resilient transparent material having an internal surface which defines an elongated bore extending the length thereof; a solid core in said bore, substantially coextensive therewith and having a channel in the external surface of said core and extending longitudinally along at least a major portion of said core, the internal surface of said shield cooperating with said channel to form therebetween a capillary passage having an open end and a closed end; fluid reservoir means connected in liquid-tight relationship with said shield and communicating with the open end of said capillary passage; and a thermally responsive fluid contained in the interior of said reservoir means; said fluid being adapted to expand into said capillary passage in response to an increase in temperature.

2. The thermometer as set forth in claim 1 wherein said channel is generally triangular in cross-section throughout at least a major portion of its length.

3. The thermometer as set forth in claim 1 wherein said channel extends longitudinally for the entire length of said core.

4. The thermometer as set forth in claim 1 wherein said shield is tubular in shape and has an inner diameter slightly smaller than the diameter of said core, and the internal surface of said shield is circumferentially stressed by said core.

5. The thermometer as set forth in claim 1 wherein said channel is convoluted about said core in a region adjacent to said fluid reservoir means.

6. The thermometer as set forth in claim 1 wherein said core has graduations and numerals, corresponding to the temperature range of the thermometer, marked longitudinally thereon.

7. The thermometer as set forth in claim 1 wherein said elongated member further includes serrations on its outer surface whereby relative movement between said member and said cover is minimized.

8. The thermometer as set forth in claim 1 wherein said reservoir means is comprised of a housing and a cap having a discharge opening, said housing having wall means defining a stem-receiving chamber at one end of the housing where said stem is received and connected in liquid-tight relationship to said housing; and wherein said housing has further wall means defining a liquid reservoir at the end of the housing opposite from said stem receiving chamber and communicating therewith; said further wall means having an opening to receive said cap, said cap being formed with a first circumferential flange having an inner diameter corresponding to the outer diameter of said further wall means adjacent said opening, said cap being formed with a second circumferential flange spaced inwardly of said first flange by a dimension corresponding to the thickness of the further wall means adjacent said opening, the outer diameter of said second flange corresponding to the inner diameter of the further wall means adjacent said opening, whereby said first and second flanges cooperate with said further wall means to form a labyrinth seal for said reservoir chamber; the second flange of said cap extending inwardly into said reservoir chamber to displace a portion of the expansible fluid therein through said discharge opening.

9. The reservoir as set forth in claim 8 wherein said housing includes a radially inwardly facing shoulder that separates said receiving chamber from said liquid reservoir chamber, said shield being seated against said shoulder.

10. The reservoir as set forth in claim 9 wherein said shoulder is circumferentially continuous and includes a planar surface defining the end of said receiving chamber.

11. A reservoir as set forth in claim 10 wherein said inwardly extending shoulder includes a central passage therethrough establishing communication between said receiving chamber and said liquid reservoir chamber, said core extending through said central passage and into said liquid reservoir chamber.

12. A reservoir as set forth in claim 11 including a projection extending inwardly from said wall means above said shoulder and engaging said shield.

13. A thermometer as set forth in claim 1 wherein said tubular shield contains an aromatic scent.

14. The thermometer as set forth in claim 1 wherein said thermally responsive fluid is a member of the group consisting of an aqueous sodium chloride solution and a lower alkylene glycol.

15. A method of forming a thermometer comprising the steps of: forming an elongated core member with a surface groove extending from end to end; directing said core member into a length of transparent tubing, said tubing having a diameter slightly smaller than the diameter of said core member; sealing one end of said tubing to form a liquid-tight closure; inserting a bulb housing over the open end of said tubing to form a liquid-tight seal therebetween; filling said bulb housing with expansible fluid; closing said bulb housing with a cap member adapted to seal against said housing while allowing fluid to flow through an opening in said cap to thereby assure a proper volume of expansible fluid in said thermometer; and sealing said opening to provide a closed chamber containing said expansible fluid and communicating with said groove.

16. The method as set forth in claim 15 including the further step of forming expansion chambers at upper and lower portions of said core member in communication with said groove, said forming step being performed prior to said directing step.

17. The method of claim 15 including the further step of forming serrations on at least a portion of the surface of said core member and placing said serrations in engagement with said tubing to prevent relative movement between said core and said tubing.

18. The method as set forth in claim 15 wherein said core member is directed into said tubing to an extent that a portion of the core member is located at and extends beyond the open end of said tubing.

19. The method as set forth in claim 15 wherein said directing step further includes pressurizing the interior of said tubing whereby said tubing will expand radially; inserting said core member axially into said expanded tubing; and depressurizing said tubing whereby said tubing will contract and seal against the circumference of said core member and form a capillary passage with said groove.

20. The method as set forth in claim 15 further comprising the step of applying an adhesive coating to the lower portion of said tubing, whereby said lower portion is adhered to said bulb housing.

21. A method of forming a thermometer comprising the steps of: forming an elongated core member with a surface groove extending end to end; providing a shield around said core member in sealing engagement with said groove to form a capillary passage; assembling a bulb housing on one end of said shield in sealing relationship therewith and communicating with said capillary passage; filling said bulb housing with an expansible substance; and sealing said bulb housing to provide a closed chamber to contain said expansible substance.

22. The method as set forth in claim 21 further comprising the steps of: evacuating air from said capillary passage at the other end of said shield subsequent to sealing the bulb housing; and sealing said other end, whereby said substance may expand and permanently remain in said capillary passage.

23. The method as set forth in claim 21 wherein said filling and sealing steps include: positioning a cap with a port therein on said bulb housing; placing said port in fluid communication with a source of expansible fluid; applying vacuum to the capillary at the other end of said shield, whereby said fluid will be drawn through said port into said bulb; removing said vacuum after said bulb is filled; and sealing the upper end of the capillary passage.

24. The method as set forth in claim 21 further including the step of sealing said capillary passage at the other end of said shield.

25. A method of forming a thermometer comprising the steps of; forming an elongated core member with a surface groove extending end to end; directing said core member into a length of flexible tubing; collapsing said tubing about said core member so as to form a capillary passage with said surface groove; applying a bulb housing having a filling port over one end of said collapsed tubing so as to form a liquid-tight seal therebetween; filling said bulb housing with an expansible fluid through said filling port; and sealing said bulb housing to provide a closed chamber containing said expansible fluid and communicating with said capillary passage.

26. The method of claim 25 wherein said bulb housing is filled by immersing the bulb housing in a bath of heated fluid, temporarily sealing said bulb in said bath, applying a vacuum to the end of said groove opposite said bulb housing, applying pressure to said tube to block said groove, releasing the temporary sealing of said bulb housing to allow fluid to flow into the bulb housing and up the groove to the point of compression.

27. The method of claim 26 wherein the step of temporarily sealing said bulb is performed by providing a resilient member in said bath of fluid, moving an opening in the bulb housing into sealing engagement with the resilient member, the step of releasing the temporary sealing of said bulb being performed by moving the bulb housing away from said resilient member.

28. The method of claim 25 wherein the step of filling said bulb housing is performed by inserting the bulb housing in a bath of heated fluid, applying a vacuum to the end of said capillary passage opposite from said bulb housing to fill through said filling port both the bulb housing and the capillary passage with fluid, releasing the vacuum, compressing the tube into blocking engagement with the groove at a predetermined point to block the capillary passage, and thereafter withdrawing fluid from the capillary passage above the point of compression.

29. The method of claim 25 wherein said thermometer is filled by immersing the bulb housing in a bath of heated fluid, applying a vacuum to the end of said capillary passage opposite from said bulb housing to fill both the bulb housing and the capillary passage with the fluid, releasing the vacuum, compressing the tube into blocking engagement with the groove at a predetermined point to block the capillary passage, sealing said filling port, and passing an air stream across the end of the capillary passage opposite from the bulb housing to withdraw fluid from the capillary passage above the point of compression; and wherein the capillary passage at the end opposite from the bulb housing is subsequently sealed.

30. A thermometer comprising: an elongated sleeve of a transparent resilient material; an elongated core substantially coextensive with said sleeve, disposed therewithin in a substantially liquid-tight relationship, and having a surface groove which extends substantially the entire length of said core and defines a capillary passage between said core and said sleeve; liquid reservoir means comprising a bulb portion having an open end communicating with said capillary passage and an upstanding skirt portion about the periphery of the open end, said skirt portion receiving one end of said elongated sleeve therewithin; and a temperature indicating liquid containing in said bulb portion and adapted to expand in said capillary passage in response to a temperature change.

31. The thermometer as set forth in claim 20 wherein said core is provided with a composite portion comprising a transparent part having a longitudinally extending groove segment and an opaque part substantially coextensive with said transparent part and presenting behind said longitudinally extending groove segment a surface bearing temperature scale markings visible through said transparent part.

32. The thermometer as set forth in claim 30 wherein the groove in that portion of said core within said upstanding skirt portion is convoluted.

33. The thermometer as set forth in claim 30 wherein one end of said core projects beyond said sleeve, wherein said projecting core end is provided with a peripheral ridge, wherein said bulb portion is provided with a complementary peripheral groove near the open end thereof, and wherein said peripheral ridge engages said complementary peripheral groove.

34. The thermometer as set forth in claim 30 wherein one end of said core projects beyond said sleeve and wherein a transverse slot communicating with said capillary passage is provided in said projecting core end; said slot being of variable depth and having a maximum depth at the juncture of said slot with said capillary passage.

35. The thermometer as set forth in claim 30 wherein said core is cylindrical and is provided with a composite portion comprising a transparent semicylindrical part and a contiguous opaque semicylindrical part, wherein said groove extends longitudinally along the curved surface of said transparent semicylindrical part and wherein temperature scale markings visible through said transparent semicylindrical part are provided on a flat surface of said opaque semicylindrical part which is facing a flat surface of said transparent semicylindrical part.

36. The thermometer as set forth in claim 35 wherein one end of said core projects beyond said sleeve and wherein the groove segment between said composite portion and said projecting core end is convoluted about said core.

37. The thermometer as set forth in claim 30 wherein said core is cylindrical and one end of said core projects beyond said sleeve, wherein a transverse slot of variable depth and communicating at its maximum depth with said capillary passageway is provided in said projecting core end, wherein said core is provided with a composite portion enveloped by said sleeve and comprising a transparent semicylindrical part having a longitudinally extending groove segment on the curved surface thereof and a contiguous complementary opaque semicylindrical part bearing temperature scale markings visible through said transparent semicylindrical part, and wherein the groove segment between said longitudinal groove segment and said slot is convoluted about said core.

38. The thermometer as set forth in claim 30 wherein one end of said core projects beyond said sleeve and is provided with a peripheral ridge about the projecting end; wherein a transverse slot of variable depth and communicating at its maximum depth with said capillary passageway is provided in said projecting core end and intersects said peripheral ridge; wherein said bulb portion is provided with an inwardly extending circular shoulder at the open end thereof and with an inner groove which receives said peripheral ridge near said open end; and wherein said sleeve at one end abuts said circular shoulder and is compressed thereagainst and forms a liquid-tight seal when said peripheral ridge engages said inner groove.

39. The thermometer as set forth in claim 30 wherein said skirt portion is provided with an inwardly tapering bore which receives one end of said elongated sleeve therewithin.

40. The thermometer as set forth in claim 30 wherein said bulb portion is provided with a filling port having inwardly tapering walls.

* * * * *